US009948656B2

(12) United States Patent
Himberger et al.

(10) Patent No.: US 9,948,656 B2
(45) Date of Patent: *Apr. 17, 2018

(54) INDIRECT USER AUTHENTICATION

(71) Applicant: International Business Machines Corporation, Armonk, NY (US)

(72) Inventors: Kevin D. Himberger, Toronto (CA); Jake Palmer, Durham, NC (US); Benjamin M. Parees, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/663,848

(22) Filed: Jul. 31, 2017

(65) Prior Publication Data

US 2017/0324747 A1 Nov. 9, 2017

Related U.S. Application Data

(63) Continuation of application No. 14/794,014, filed on Jul. 8, 2015.

(51) Int. Cl.
*H04L 29/06* (2006.01)
*G06F 12/14* (2006.01)
*G06F 3/06* (2006.01)

(52) U.S. Cl.
CPC .......... *H04L 63/104* (2013.01); *G06F 3/0622* (2013.01); *G06F 3/0637* (2013.01); *G06F 3/0671* (2013.01); *G06F 12/1458* (2013.01); *H04L 63/02* (2013.01); *H04L 63/08* (2013.01); *H04L 63/101* (2013.01);

(Continued)

(58) Field of Classification Search
CPC ..... H04L 63/104; H04L 63/08; H04L 63/101; H04L 63/102; H04L 63/083; G06F 12/1475; G06F 12/1458; G06F 2212/1052; G06F 3/0622; G06F 3/0671; G06F 3/0637
See application file for complete search history.

(56) References Cited

U.S. PATENT DOCUMENTS 6,782,425 B1  8/2004  Germscheid et al.
7,555,645 B2  6/2009  Vissapragada
(Continued)

OTHER PUBLICATIONS

Disclosed Anonymously et al., "Method and System for credential classification and reuse within IT systems", IP.com No. 000206811, IP.com Electronic Publication: May 9, 2011, pp. 1-4.

(Continued)

*Primary Examiner* — Yin-Chen Shaw
*Assistant Examiner* — Arya Golriz
(74) *Attorney, Agent, or Firm* — James H. Mayfield; William H. Hartwell

(57) ABSTRACT

As disclosed herein, a computer program product, executed by a computer, includes receiving, from a user, a request for access to a shared system, wherein the request comprises a user identifier and a user password corresponding to the user, and determining privileges corresponding to the shared system using the user identifier. The computer program product further includes requesting, from an identity manager, a shared identifier and a shared password corresponding to the shared system, receiving, from the identity manager, the shared identifier and the shared password, and using the shared identifier and the shared password to enable the user to use the shared system.

1 Claim, 4 Drawing Sheets

(52) U.S. Cl.
CPC .. *G06F 12/1475* (2013.01); *G06F 2212/1052* (2013.01); *H04L 63/083* (2013.01)

(56) References Cited

U.S. PATENT DOCUMENTS

| | | | |
|---|---|---|---|
| 7,610,390 | B2 | 10/2009 | Yared et al. |
| 8,136,148 | B1 | 3/2012 | Chayanarn et al. |
| 8,595,809 | B2 | 11/2013 | Chayanam et al. |
| 8,887,257 | B2 | 11/2014 | Haggerty et al. |
| 9,531,727 | B1 | 12/2016 | Himberger et al. |
| 2005/0160297 | A1 | 7/2005 | Ogawa |
| 2006/0137000 | A1 | 6/2006 | Isaacson |
| 2007/0055889 | A1 | 3/2007 | Henneberry et al. |
| 2007/0130343 | A1 | 6/2007 | Pardo-Blazquez et al. |
| 2007/0150934 | A1 | 6/2007 | Fiszman et al. |
| 2009/0089625 | A1 | 4/2009 | Kannappan et al. |
| 2009/0265464 | A1 | 10/2009 | Jakobson |
| 2011/0083190 | A1 | 4/2011 | Brown et al. |
| 2011/0247059 | A1 | 10/2011 | Anderson et al. |
| 2012/0072979 | A1 | 3/2012 | Cha et al. |
| 2012/0197957 | A1 | 8/2012 | De Voogd |
| 2012/0216268 | A1 | 8/2012 | Kassael et al. |
| 2012/0254957 | A1 | 10/2012 | Fork et al. |
| 2015/0278510 | A1 | 10/2015 | Alexander |
| 2017/0012990 | A1 | 1/2017 | Himberger et al. |

OTHER PUBLICATIONS

IBM, "IBM Security Privileged Identity Manager helps prevent insider threats", © Copyright IBM Corporation 2013, pp. 1-6, <http://onwireco.com/wp-content/uploads/2013/12/IBM_Security_Privileged_Identity_Manager.pdf>.

Internet Society Requests for Comment (RFCs) et al., "Trustworthy Location (RFC7378)", Origianl Publication Date: Dec. 1, 2014, IP.com No. 000239965, IP.com Electronic Publication: Dec. 18, 2014, pp. 1-63.

Himberger et al., "Indirect User Authentication", U.S. Appl. No. 15/663,849, filed Jul. 31, 2017, 25 pages.

IBM Appendix P, list of patents and patent applications treated as related, Jul. 31, 2017, 2 pages.

INDIRECT USER AUTHENTICATION

BACKGROUND

The present invention relates to user authentication, and more particularly to indirect user authentication.

In computing, user access to a computing system is controlled using identity management. Identity management is the process of controlling information about user accounts corresponding to the computer. User information may include details such as information that authenticates (i.e., verifies) the identity of a user, information that describes privileges and authorities the user is entitled to, and the like. A user can authenticate his identity to the computer by providing his authentication credentials. Authentication credentials may include a user ID and a password that have been assigned to uniquely identify the user.

Privileged identity management focuses on the special requirements of controlling access to powerful user accounts (i.e., privileged user IDs) within the information technology (IT) infrastructure of a company. As a general rule, IT organizations prefer to limit the number of privileged user IDs created on a system (e.g., one administrator user ID, one user ID with application deploy authority, etc). With only one administrator user ID, all users with authority to perform administrative tasks share the administrator user ID and password. Similarly, other privileged user IDs and passwords may be shared in the same way.

SUMMARY

As disclosed herein, a computer program product, executed by a computer, includes receiving, from a user, a request for access to a shared system, wherein the request comprises a user identifier and a user password corresponding to the user, and determining privileges corresponding to the shared system using the user identifier. The computer program product further includes requesting, from an identity manager, a shared identifier and a shared password corresponding to the shared system, receiving, from the identity manager, the shared identifier and the shared password, and using the shared identifier and the shared password to enable the user to use the shared system.

DETAILED DESCRIPTION

Privileged user IDs corresponding to a computer system may have system privileges and authorities beyond that of an ordinary user of the computer system. The activities and operations performed by a privileged user ID may be logged in command logs, activity logs, and the like. However, if a privileged user ID and password have been shared, there is no way of confirming which user may have been using the privileged user ID at any given time.

If an audit or monitoring operation detects suspicious activity corresponding to a privileged user ID, and the privileged user ID has been shared, there may be no way to identify the user responsible for the suspicious activity. It has been determined that there is a need to provide auditable indirect user authentication, allowing authorized users to share a privileged user ID without having direct access to the password corresponding to the privileged user ID. Additionally, whenever a privileged user ID is shared, it should be confirmed that the user of the shared user ID has followed the proper procedures to gain accessed to the computer system. The embodiments disclosed herein generally address the above-described problems.

Figure 1:
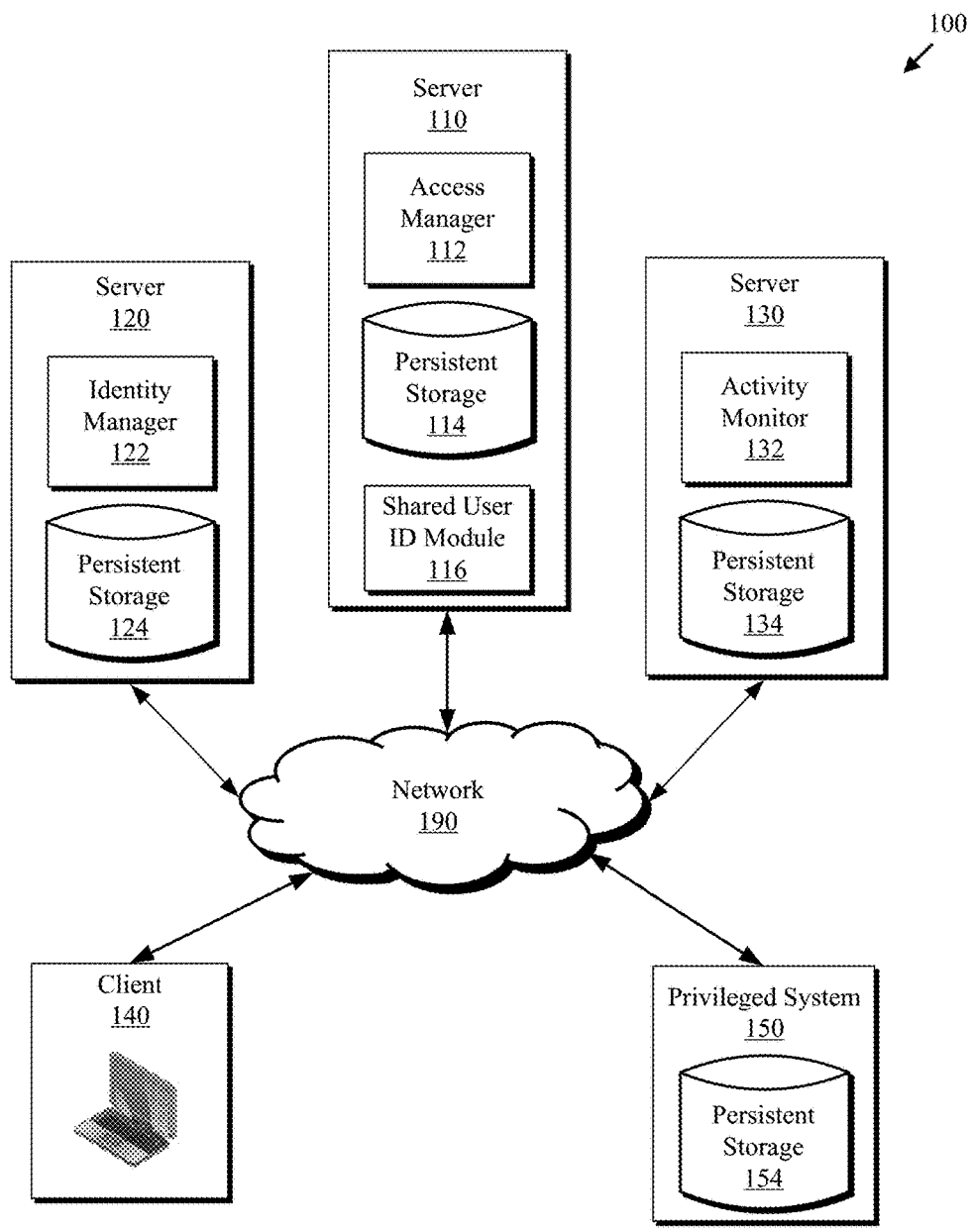
FIG. 1 is a functional block diagram depicting a computing environment in accordance with at least one embodiment of the present invention.

The present invention will now be described in detail with reference to the Figures. FIG. 1 is a functional block diagram depicting a computing environment 100 in accordance with an embodiment of the present invention. Computing environment 100 includes servers 110, 120, and 130, client 140 and privileged system 150 which can be smart phones, tablets, desktop computers, laptop computers, specialized computer servers, or any other computer systems known in the art capable of communicating over network 190. In some embodiments, servers 110, 120, and 130 represent computer systems utilizing clustered computers and components to act as a single pool of seamless resources when accessed through network 190. In general, servers 110, 120, and 130, client 140 and privileged system 150 are representative of any electronic devices, or combination of electronic devices, capable of executing machine-readable program instructions, as described in greater detail with regard to FIG. 4.

As depicted, server 110 includes access manager 112, persistent storage 114, and shared user ID module 116. Shared user ID module 116 may be configured to monitor and manage requests for access to shared user IDs. A shared user ID may be a user ID that is used by more than one user and may have system level access privileges or greater authority than that of an ordinary user. Access manager 112 may be configured to manage authentication and authorization of user ID requests for resources (e.g., web services, operating systems, and existing applications). If shared user ID module 116 detects a request for a shared user ID from a client 140, then shared user ID module 116 may pass the request to access manager 112 for continued processing. Access manager 112 may determine if the user logged into client 140 is authorized to use the shared user ID.

In some embodiments, a user requests a specific shared user ID on privileged system 150. In other embodiments, a user requests privileged access to privileged system 150, without specifying a specific user ID, and access manager 112 provides a shared user ID that corresponds to the authorizations assigned to the requesting user ID. Shared user ID module 116 may receive from access manager 112 the shared user ID and the password corresponding to the shared user ID. All activities corresponding to access manager 112 and shared user ID module 116 may retained in log files and stored on persistent storage 114.

As depicted, server 120 includes identity manager 122 and persistent storage 124. Identity manager 122 (sometimes referred to as a password vault) may be a registry of passwords corresponding to shared user IDs, and may be implemented as a software solution, a hardware solution, or a combination of the two. Identity manager 122 may provide additional security by encrypting the stored passwords. The user ID information (e.g., the user ID, user ID privileges, and password) as well as activity logs may be stored on persistent storage 124.

As depicted, server 130 includes activity monitor 132 and persistent storage 134. Activity monitor 132 monitors computing systems attached to network 190, such as privileged system 150 and others (not shown), to detect access via a shared user IDs. If activity monitor 132 detects suspicious activity corresponding to a shared user ID (e.g., the user of the shared user ID did not did not follow a required protocol for or procedures to gain access to privileged system 150), then activity monitor 132 may take actions to prohibit the user from accessing privileged system 150, such as, forcefully terminating the session associated with the shared user ID, sending alerts to an administrator or security group, and generating detailed log information such as, login time, connection client information, identifying the detected activity, and the like. Activity monitor 132 may retain, on persistent storage 134, logs containing details of detected use of shared user IDs. The recorded information may include, but is not limited to, the shared user ID, the name of the individual using the shared user ID, the login and logout times, and all commands issued. When performing monitoring operations, activity monitor 132 may access log information from persistent storage 114 (access manager 112), persistent storage 124 (identity manager 122), and persistent storage 154 (privileged system 150).

Persistent storage 114, 124, 134, and 154 may be any non-volatile storage media known in the art. For example, persistent storage 114, 124, 134, and 154 can be implemented with a tape library, optical library, one or more independent hard disk drives, or multiple hard disk drives in a redundant array of independent disks (RAID). Similarly, data on persistent storage 114 may conform to any suitable storage architecture known in the art, such as a file, a relational database, an object-oriented database, and/or one or more tables.

Servers 110, 120, and 130, client 140, privileged system 150, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between Servers 110, 120, and 130, client 140, and privileged system 150, in accordance with an embodiment of the present invention.

Figure 2:
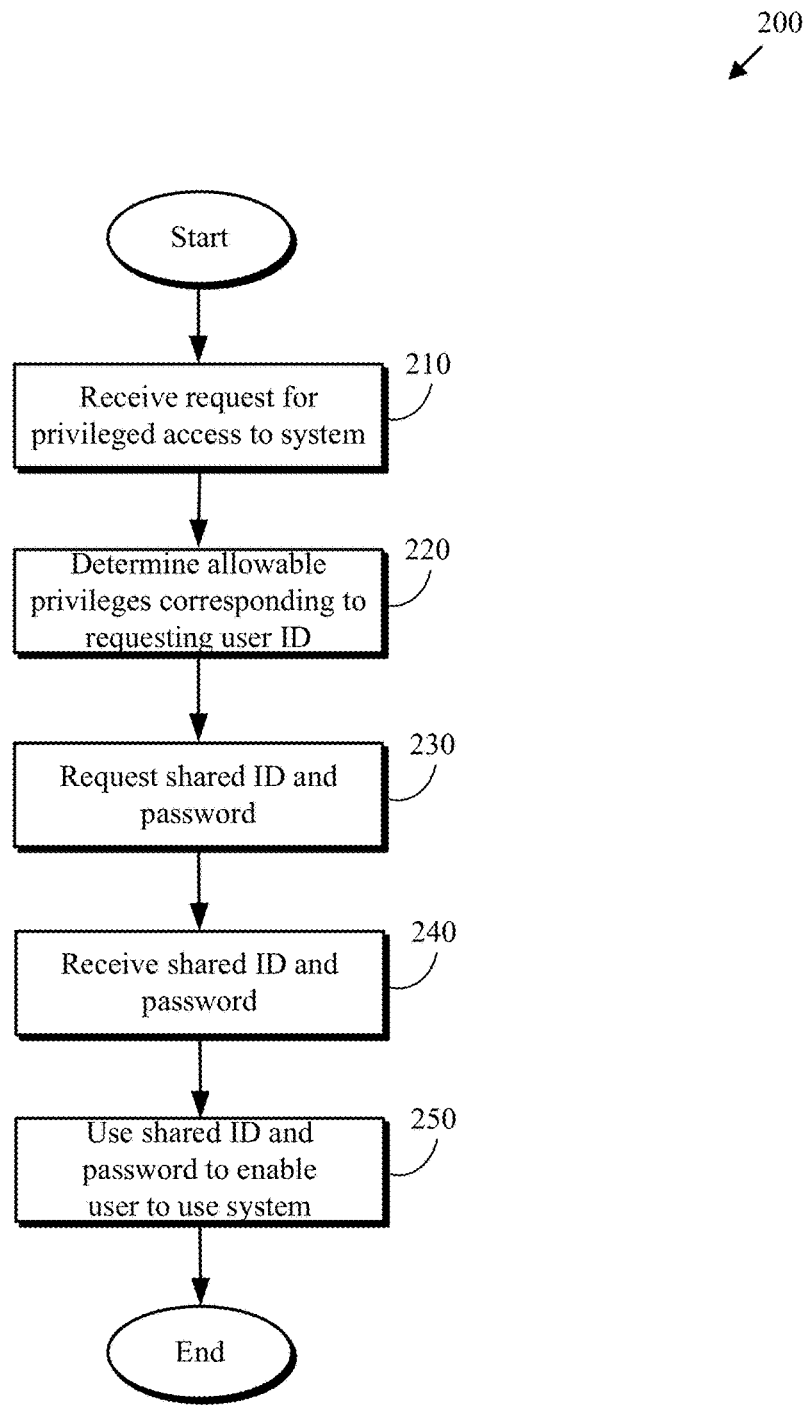
FIG. 2 is a flowchart depicting a shared user ID method, in accordance with at least one embodiment of the present invention.

FIG. 2 is a flowchart depicting a shared user ID method 200, in accordance with at least one embodiment of the present invention. As depicted, shared user ID method 200 includes receiving (210) a request for shared user ID access to a system, determining (220) allowable privileges, requesting (230) a shared user ID and password, receiving (240) a shared user ID and password, and using (250) a shared user ID and password to enable the user to use a system. Shared user ID method 200 enables a shared ID module (e.g. shared user ID module 116) to manage and monitor access to shared user IDs.

Receiving (210) a request for shared user ID access to a system may include shared user ID module 116 receiving a request for shared user ID access to a computer system (e.g., privileged system 150). The request may be initiated from a user logged into a client computer (e.g., client 140). In some embodiments, the user initiates the request for shared user ID access by authenticating (e.g. providing a user ID and password) with shared user ID module 116. The authentication operation may verify the identity of the requester. In other embodiments, shared user ID module 116 verifies the identity of the requester by obtaining details of the logged in user from client 140.

Determining (220) allowable privileges may include shared user ID module 116 using the verified identity of the user requesting privileged access to determine if the requesting user is authorized to use a shared ID. In some embodiments, a user requests to use a specific shared user ID on privileged system 150, and shared user ID module 116 uses the verified identity of the requesting user to determine if the requesting user is authorized to use the requested shared user ID. In other embodiments, a user requests privileged access to privileged system 150 (without requesting a specific ID), and shared user ID module 116 uses the verified identity of the requesting user to determine an appropriate shared user ID with privileges that correspond to the privileges the requesting user is authorized to have.

In one embodiment, share ID module 116 performs the operations to determine if a requesting user is authorized to use a shared user ID. In another embodiment, share ID module 116 requests that an access manager (e.g., access manager 112) perform the operations to determine if the requesting user is authorized to use a shared user ID. The operations to determine if a requesting user is authorized to use a shared user ID are described in greater detail in the description of FIG. 3. If it is determined that the requesting user is not authorized to use the shared ID, then the request is denied, and no further processing occurs.

Requesting (230) a shared user ID and password may include shared user ID module 116 requesting that an access manager (e.g. access manager 112) provide the login credentials for a specific shared user ID. In some embodiments, shared user ID module 116 requests the shared user ID and password from access manager 112. In other embodiments, shared user ID module 116 requests the shared user ID from access manager 112, and requests the password corresponding to the share user ID from identity manager 122.

Receiving (240) a shared user ID and password may include shared user ID module 116 receiving login credentials corresponding to a shared user ID. In some embodiments, the login credentials include a shared user ID and an encrypted password. In other embodiments, the login credentials include a shared user ID and a plain text password. In one embodiment, shared user ID module 116 receives an indication that the shared user ID is currently unavailable (e.g., the shared user ID is currently in use). If the shared user ID is unavailable, the request is terminated and an informative message is provided to the user. In another embodiment, the shared user ID is available (i.e., it is not currently in use) and access manager 112 obtains the password from identity manager 122 and provides both the shared user ID and password to shared user ID module 116. In yet another embodiment, shared user ID module 116 receives the shared user ID from access manager 112, and receives the password corresponding to the shared user ID from identity manager 122.

Using (250) a shared user ID and password to enable the user to use a system may include shared user ID module 116 providing the shared user ID to the user. In some embodiments, shared user ID module 116 provides the shared user ID to client 140. In other embodiments, shared user ID module 116 automatically initiates the login procedure on behalf of client 140 without providing the share user ID to client 140. In another embodiment, the user begins the login operation on client 140 using the provided shared user ID. Then privileged system 150 requests the password from shared user ID module 116, and shared user ID module 116 provides the encrypted password to privileged system 150 without the user having access to the password. To assure controlled access to the shared user ID, shared user ID module 116 may never expose, to client 140, the password corresponding to the share user ID to client 140.

When shared user ID module 116 grants a user permission to use a shared user ID, the duration of the authorization may be limited. In one embodiment, the authority is limited to a single login session and if additional login sessions are require, a new shared user ID request is required for each session. In other embodiments, there is a time limit associates with the granted authority. For example, the session login must occur within 10 minutes of approval and cannot continue for more than 2 hours. Throughout the operation of shared user ID method 200, logs may be maintained to enable auditing and reporting operations (e.g. generating a report listing the users who have requested access to specific shared user IDs). Depending on the operation, the logs may be stored on persistent storage, such as persistent storage 114, 124, 134, and/or 154.

Figure 3:
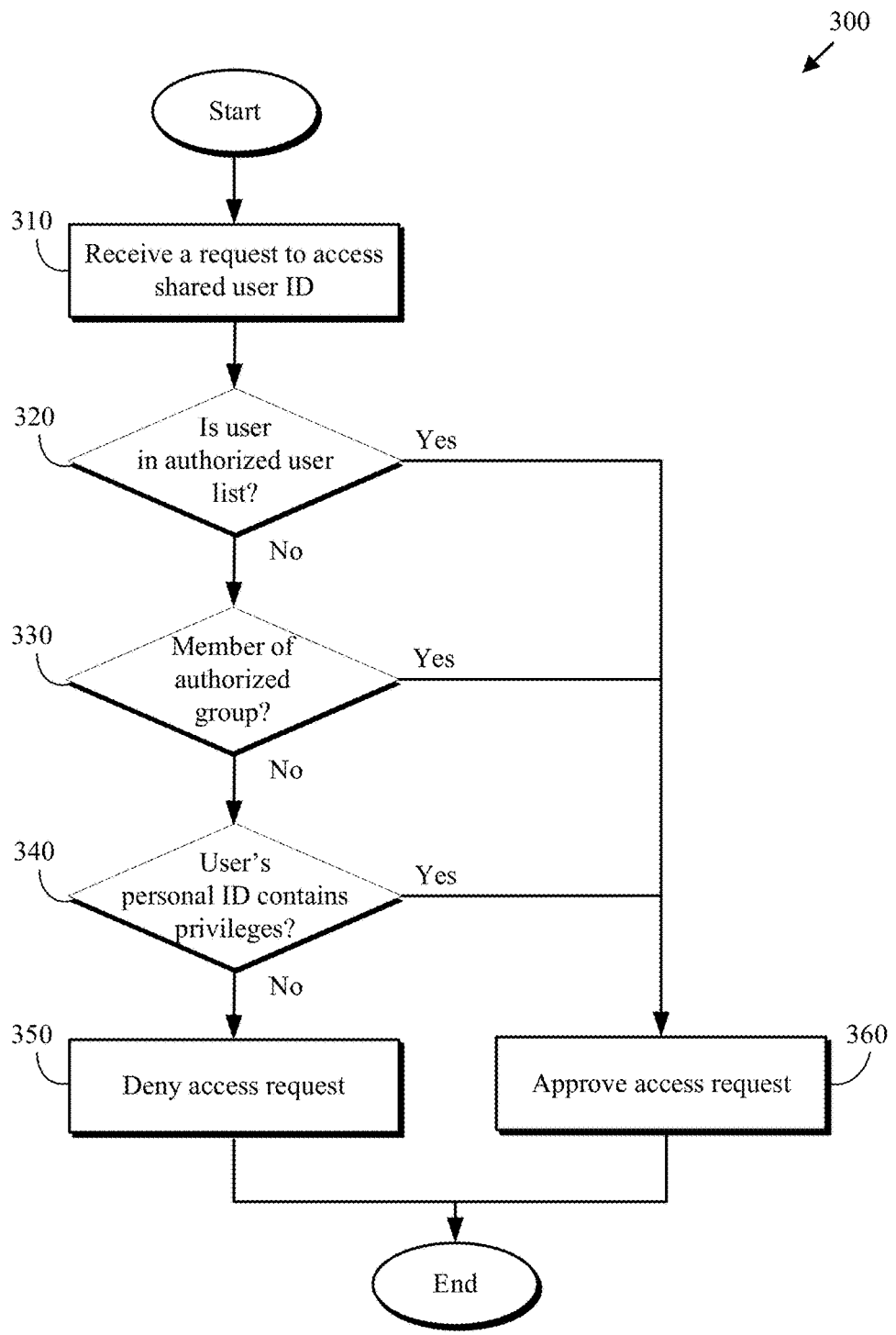
FIG. 3 is a flowchart depicting an authorization detection method, in accordance with at least one embodiment of the present invention.

FIG. 3 is a flowchart depicting an authorization detection method 300, in accordance with at least one embodiment of the present invention. As depicted, authorization detection method 300 includes receiving (310) a request to access a shared user ID, determining (320) whether the user is included in an authorized user list, determining (330) whether the user is a member of an authorized user group, determining (340) whether the user's user ID contains appropriate privileges, denying (350) the access request, and approving (360) the access request. Authorization detection method 300 determines if a user ID has the authority to access a shared user ID. The depicted embodiment of authorization detection method 300 contains three decision operations, however, other embodiments of authorization detection method 300 may contain a subset of the depicted decision operations, none of the depicted decision operations, additional decision operation, or a combination thereof.

Receiving (310) a request to access a shared user ID may include receiving a request that includes: (i) the system on which a share user ID is being requested (the shared system), (ii) the shared user ID being requested, and (iii) credentials that identify the user making the request (the requesting user). In some embodiments, the request does not contain credentials identifying the requesting user, and the requesting user is presented with a challenge allowing the requesting user to identify himself by providing a user ID and password. In other embodiments, the credentials (e.g., a user ID, employee serial number, or the like) that uniquely identify the requesting user are provided as a part of the request.

Determining (320) whether the user is included in an authorized user list may include retrieving, from persistent storage (e.g., persistent storage 114, or 154), a predetermined list of users that have been approved to be given access to the requested shared user ID on the shared system. In some embodiments, the authorized user list comprises user IDs. In other embodiments, the authorized user list comprises employee serial numbers. If the credentials of the requesting user are contained in the authorized user list corresponding to the shared system, then authorization detection method 300 proceeds to approving (360) the access request. Otherwise, the method proceeds to determining operation 330.

Determining (330) whether the user is a member of an authorized user group may include identifying a privileged user group the requested shared user ID belongs to. If the user ID of the requesting user is also in the privileged user group, then authorization detection method 300 proceeds to approving (360) the access request. Otherwise, the method proceeds to determining operation 340.

Determining (340) whether the user's user ID contains appropriate privileges may include analyzing the privileges associated with the user ID of the requesting user. In some environments, for ownership reasons, it is required that a specific user ID perform all privileged operations. If the user ID identified by the credentials of the requesting user contains at least the same level of authorization as the shared user ID being requested, then authorization detection method 300 proceeds to approving (360) the access. Otherwise, the method proceeds to denying (350) the access request.

Denying (350) the access request may include terminating authorization detection method 300, and notifying the user the request has been denied. In some embodiments, the requesting user is presented with an error message indicating that the user ID is not authorized to use the requested shared user ID. In other embodiments, an email, identifying the user and the shared user ID in the failed attempt, is sent to appropriate administrative and security organizations. In another embodiment, the failed attempt is recorded in an activity log. The activity log may be retained on persistent storage (e.g., persistent storage 114).

Approving (360) the access request may include notifying the requester that the requesting user is authorized to us the requested shared user ID on the shared system. In some embodiments, the approval is recorded in an activity log. The activity log may be retained on persistent storage (e.g., persistent storage 114). Authorization detection method 300 has run to a successful completion.

Figure 4:
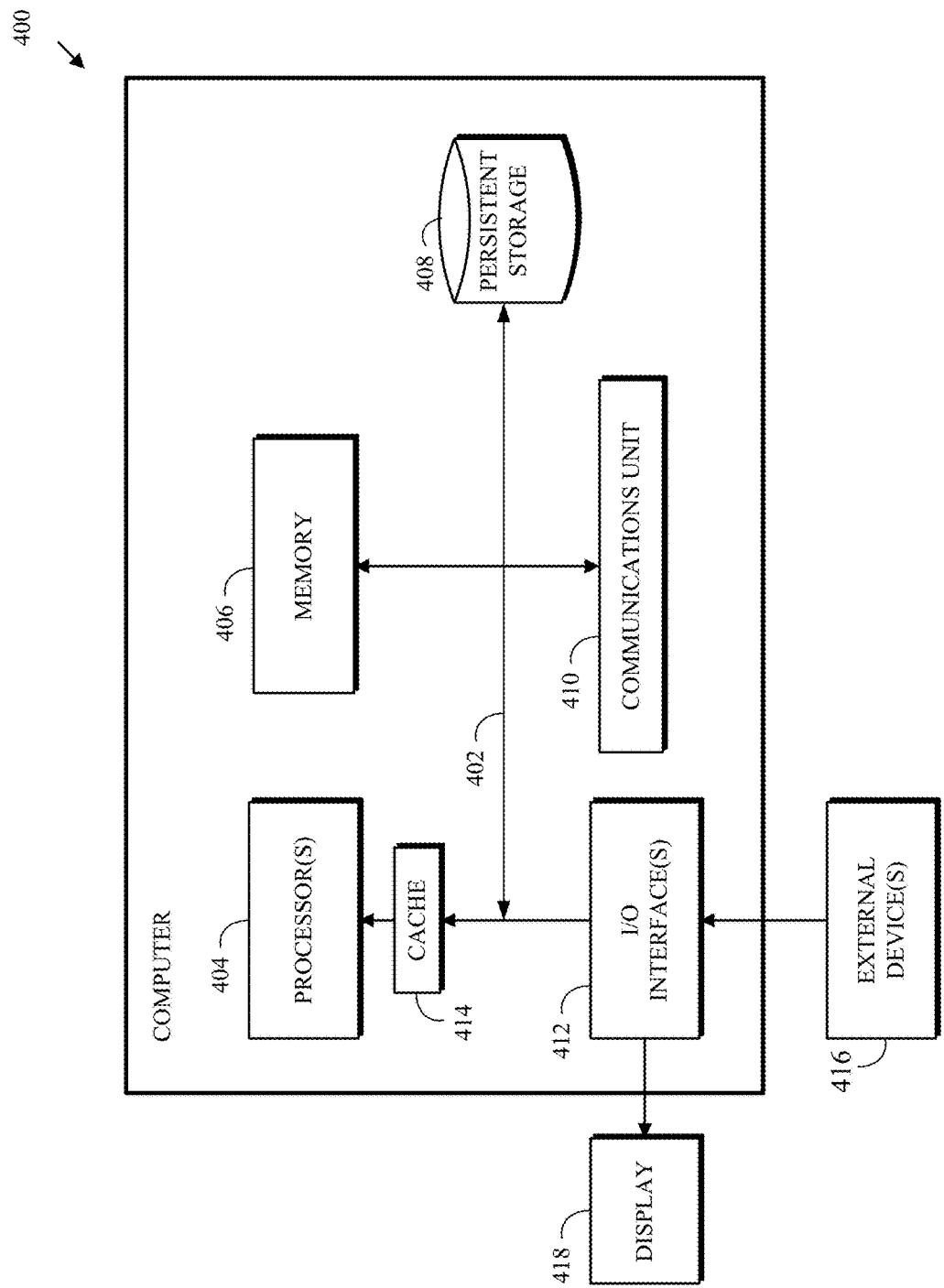
FIG. 4 is a block diagram depicting various components of one embodiment of a computer suitable for executing the methods disclosed herein.

FIG. 4 depicts a block diagram of components of a computer system 400, which is an example of systems such as Servers 110, 120, and 130, client 140, privileged system 150 within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Servers 110, 120, and 130, client 140, and privileged system 150 include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., shared user ID method 200 and authorization detection method 300 are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of servers 110, 120, and 130, client 140, and privileged system 150. In these examples, communications unit 410 includes one or more network interface cards. Communications unit 410 may provide communications through the use of either or both physical and wireless communications links. Program instructions and data used to practice embodiments of shared user ID method 200 and authorization detection method 300 may be downloaded to persistent storage 408 through communications unit 410.

I/O interface(s) 412 allows for input and output of data with other devices that may be connected to each computer system. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
one or more computer readable storage media and program instructions stored on the one or more computer readable storage media, the program instructions comprising instructions for:
receiving, from one or more users, a request for access to a shared system, wherein the request comprises a shared system identifier that indicates the shared system for which access is being requested, a shared user identifier, and a user identifier and a user password corresponding to the one or more users;
determining if the one or more users are authorized to access the shared system by confirming the user identifier of each of the one or more users includes at least the same level of authorization as the shared user identifier and one or more of:
confirming the one or more users are included in an authorized user list, and
confirming the one or more users are a member of an authorized user group;
responsive to determining that the one or more users are authorized to access the shared system, requesting, from an identity manager, the shared user identifier and a shared password corresponding to the shared system;
receiving, from the identity manager, the shared user identifier and the shared password, and providing the shared user identifier to each of the one or more users, and automatically authenticating each of the one or more users on the shared system using the shared user identifier and the shared password;
using the shared user identifier and the shared password of each of the one or more users to enable the one or more users to use the shared system, wherein the shared password is not provided to the any of the one or more users; and
retaining details corresponding to the request for access to the shared system by the one or more users in one or more logs, analyzing the one or more logs to determine that a particular user of the shared system is accessing the shared system without following a required protocol to gain access, prohibiting access to the shared system by the particular user by terminating an active session of the particular user, and sending an alert to a security administrator, wherein the alert comprises one or more of login time of the particular user, connection client information corresponding to the particular user, and activity of the particular user.

* * * * *